United States Patent [19]

Tanaka et al.

[11] Patent Number: 4,744,677
[45] Date of Patent: May 17, 1988

[54] BUSH ASSEMBLAGE

[75] Inventors: Toru Tanaka, Nagoya; Koji Sawada, Toyota; Takafumi Tachibana; Koji Shinohara, both of Kasugai, all of Japan

[73] Assignees: Tokai Rubber Industries, Ltd.; Toyota Jidosha Kabushiki Kaisha, both of Aichi, Japan

[21] Appl. No.: 802,051

[22] Filed: Nov. 25, 1985

[30] Foreign Application Priority Data

Nov. 27, 1984 [JP] Japan ................ 59-249942
Nov. 27, 1984 [JP] Japan ................ 59-249943
Nov. 27, 1984 [JP] Japan ................ 59-249944

[51] Int. Cl.$^4$ ............... F16C 27/06; B60G 11/22; F16F 1/14
[52] U.S. Cl. ................ 384/222; 267/141; 267/279; 267/292; 403/225
[58] Field of Search ........... 403/225, 226, 227, 228; 280/671, 691, 716; 267/57.1 R, 57.1 A, 63 R, 63 A, 141.4, 141; 384/125, 192, 202, 215, 220–222, 147, 151, 153, 276, 286, 291, 296, 420

[56] References Cited

U.S. PATENT DOCUMENTS

| | | | |
|---|---|---|---|
| 1,794,782 | 3/1931 | Lord | 403/203 |
| 3,039,831 | 6/1962 | Thomas | 384/222 |
| 3,268,280 | 8/1966 | Miller | 384/153 |
| 3,494,676 | 2/1970 | Compton | 384/222 |
| 3,604,771 | 9/1971 | Luzsicza | 384/125 |
| 3,666,301 | 5/1972 | Jorn | 287/85 R |
| 4,007,924 | 2/1977 | Jorn et al. | 267/57.1 R |
| 4,491,429 | 1/1985 | Matoba et al. | 384/221 |

FOREIGN PATENT DOCUMENTS

| | | | |
|---|---|---|---|
| 229080 | 11/1958 | Australia | 384/286 |
| 714689 | 11/1941 | Fed. Rep. of Germany . | |
| 1645940 | 6/1952 | Fed. Rep. of Germany . | |
| 1271565 | 6/1968 | Fed. Rep. of Germany . | |
| 3113049 | 10/1982 | Fed. Rep. of Germany . | |
| 1162881 | 9/1958 | France . | |
| 85464 | 7/1965 | France . | |
| 2352681 | 5/1977 | France . | |
| 697636 | 11/1965 | Italy | 403/228 |
| 52-64570 | 5/1977 | Japan . | |
| 411622 | 6/1934 | United Kingdom . | |

Primary Examiner—David Werner
Attorney, Agent, or Firm—Parkhurst & Oliff

[57] ABSTRACT

A bush assemblage having an inner sleeve, an outer sleeve disposed around the inner sleeve in co-axial and radially-spaced relation thereto, a rigid sleeve member disposed between the inner and outer sleeves, a cylindrical resilient member interposed between the outer sleeve and the rigid sleeve member, and a cylindrical sliding member interposed between the inner sleeve and the rigid sleeve member, a retainer member located at at least one of axial ends of the inner sleeve to extend radially outwardly, and a sealing device for sealing at least between the inner sleeve and the rigid sleeve member. The sealing device includes a rubber member which is disposed on the retainer member and an axial end of the rigid sleeve member corresponding to the at least one axial end of the inner sleeve, and which abuts against the other.

24 Claims, 6 Drawing Sheets

BUSH ASSEMBLAGE

BACKGROUND OF THE INVENTION

1. Field of the Art

The present invention relates generally to a bush assemblage which is disposed between two members in a vibration system for resiliently connecting the two members so as to damp vibrations in the system, and more particularly to such bush assemblage, especially for the pivotal connection of a suspension member in an automotive vehicle, of generally cylindrical shape which comprises an inner sleeve, an outer sleeve, and a cylindrical resilient member interposed between the inner and outer sleeves.

2. Related Art Statement

A bush assemblage used for a pivotal connection in a vehicle suspension, for example, a bush assemblage, such as a control arm bush mounted in a connecting portion between a control arm and a member of a car body side or car chassis side, is generally constructed of a couple of concentrically placed metal sleeves, i.e., an inner metal sleeve and an outer metal sleeve, with a cylindrical resilient or elastic member of rubber material interposed therebetween. Such bush assemblages are aimed to, owing to the spring characteristics of the resilient member, absorb or damp mainly vibrations in their radial direction, i.e., perpendicular direction to the axis thereof. However, the use of a relatively hard rubber material as the resilient member in such bush assemblages causes the assemblages to demonstrate relatively hard or stiff circumferential spring characteristics, i.e. spring characteristics in their circumferential direction or the direction of twisting about their axis.

Some proposals have been made so far to mitigate that undesirable circumferential spring characteristic or twisting spring action, by means of interposing a sliding member or friction-reducing means between the inner metal sleeve and the resilient member, for example: U.S. Pat. No. 3,331,642, and Japanese Utility Model Application laid open in 1984 under Publication No. 59-153736. In such proposed bush assemblages, the friction resistance between the inner metal sleeve and the resilient member is decreased due to interposing of the sliding member, and relative rotation between the sleeve and the resilient member is made considerably smooth around the axis, irrespective of the extent of radial rigidity. It allows reduction of the rigidity around the axis, while maintaining the radial rigidity of the bush assemblage.

3. Problems Solved by the Invention

In such a bush assemblage provided with the sliding member, there still remain some problems.

Possible ingress of particles (such as dirt and sand grains) and mud water between the sliding member and the inner sleeve may cause some cracks or scratches and consequently cause rusting on the sliding surface of the sleeve which is usually made of metallic material. It in turn deteriorates the sliding action itself therebetween, thereby possibly resulting in degradation of the originally aimed reduction effect of the twisting spring action by the sliding member.

SUMMARY OF THE INVENTION

It is accordingly an object of the present invention to provide a bush assemblage which has improved sliding action in its circumferential direction.

According to the present invention, there is provided a bush assemblage having an inner sleeve, an outer sleeve disposed around the inner sleeve in co-axial and radially-spaced relation with each other, a rigid sleeve member disposed between the inner and outer sleeves, a cylindrical resilient member interposed between the outer sleeve and the rigid sleeve member, and a cylindrical sliding member interposed between the inner sleeve and the rigid sleeve member, comprising: a retainer member located at at least one of axial ends of the inner sleeve to extend radially outwardly; and a sealing means for sealing between at least the retainer and the rigid sleeve member, the sealing means including a rubber member which is disposed on one of the retainer member and an axial end of the rigid sleeve member corresponding to the above-identified at least one axial end of the inner sleeve and which abuts against the other.

In the above assemblage, the rubber member, disposed between the retainer member and the corresponding axial end of the rigid sleeve member, prevents dirt, sand grain, mud water, etc., from ingressing thereinto, so as to ensure advantageous relative rotation between the sliding member and the rigid sleeve member and/or between the sliding member and the inner sleeve. That is, the rubber member permits the sliding member to realize the originally expected effects of mitigating the twisting spring action of the resilient member.

Being interposed between the rigid sleeve member of relatively high rigidity and the inner sleeve and protected by the two members, the sliding member is therefore effectively protected against deformation, cracking, etc., caused by the vibrational load or the like. That leads to elongation of life of the bush assemblage as well as maintenance of the effects of the sliding member, e.g. satisfactory reduction of rotation resistance of the bush assemblage.

In accordance with one embodiment of the invention, the rigid sleeve member has an outer flange extending radially outwardly from one of axial ends thereof situated on the side of the retainer member, and the rubber member is disposed on an axially external surface of the outer flange and abuts against the retained member.

According to another embodiment of the invention, the resilient member is secured, both to the inner surface of the outer sleeve and to the outer surface of the rigid sleeve member, through vulcanization on the spot between the outer sleeve and the rigid sleeve member, so as to make an integral body consisting of the outer sleeve, the resilient member and the rigid sleeve member.

In a further embodiment of the invention, the sliding member is made of an oil-containing plastic material.

According to a yet further embodiment, the retainer member is located at each of the axial ends of the inner sleeve, and the sealing means is provided so as to correspond to each of the retainer members.

According to another aspect of the invention, there is provided a bush assemblage having an inner sleeve, an outer sleeve disposed around the inner sleeve in co-axial and radially-spaced relation with each other, a rigid sleeve member disposed between the inner and outer sleeves, and a cylindrical resilient member interposed between the outer sleeve and the rigid sleeve member, comprising: a retainer member located at at least one of axial ends of the inner sleeve to extend radially outwardly; a sealing means for attaining sealing at least between the retainer member and the rigid sleeve member, the sealing means including a rubber which is disposed on one of the retainer member and an axial end of the rigid sleeve member corresponding to the above-identified at least one axial end of the inner sleeve and which abuts against the other; and a cylindrical sliding member interposed between the inner sleeve and the rigid sleeve member, and consisting of a pair of separate cylindrical parts while an annular space of a predetermined size is defined by the pair of cylindrical parts, the inner sleeve and the rigid sleeve member, one of the separate cylindrical parts being situated on the side of the retainer member having an outer flange which extends radially outwardly from one of axial ends thereof situated on the side of the retainer member.

The aforementioned annular space of predetermined size which is confined by the inner sleeve, the rigid sleeve member and both non-flanged ends of the cylindrical parts of the sliding member, can function as an oil reservoir for lubricating oil which has been smeared on the surfaces of the cylindrical parts, etc. The lubricating oil of the reservoir (the annular space) is progressively supplied to the surfaces of the inner sleeve, the sliding member, etc., by means of repeated rotations of those members. The annular hollow space greatly contributes, along with the the sealing rubber member, to enhancement of the effects of the sliding member on the rotation-resistance reduction. The annular space also contributes, along with the inner sleeve and the rigid sleeve member, to protection of the sliding member by decreasing wearing of the sliding surfaces. As a result, life of the bush assemblage is elongated. The size of the annular space is defined large enough to work effectively as a reservoir as set forth above.

According to a further aspect of the invention, there is provided a bush assemblage having an inner sleeve, and an outer sleeve disposed around the inner sleeve in co-axial and radially-spaced relation with each other, a cylindrical resilient member disposed between the outer and the inner sleeves and adjacent to the outer sleeve, and a cylindrical sliding member disposed between the inner sleeve and the cylindrical resilient member and adjacent to the inner sleeve, comparising: a rigid sleeve member interposed between the resilient member and the sliding member, and having an outer flange which extends radially outwardly form at least one of axial ends thereof and a first cylindrical portion which extends axially inwardly from the circumferential edge of the outer flange; a retainer member located at one of axial ends of the inner sleeve corresponding to the above-mentioned at least one axial end of the rigid sleeve member, and having a second cylindrical portion which extends axially inwardly from the circumferential edge thereof while surrounding the first cylindrical portion of the rigid sleeve member at a predetermined distance away therefrom; and a sealing rubber member for sealing between the first cylindrical portion of the rigid sleeve member and the second cylindrical portion of the retainer member, the sealing rubber member being disposed on one of the outer surface of the first cylindrical portion and the inner surface of the second cylindrical portion, and abutting against the other.

According to a yet further aspect of the invention, there is provided a bush assemblage having an inner sleeve, an outer sleeve disposed around the inner sleeve in co-axial and radially-spaced relation with each other, a cylindrical resilient member disposed between the outer and inner sleeves and adjacent to the outer sleeve, and a cylindrical sliding member interposed between the inner sleeve and the resilient member and adjacent to the inner sleeve, comprising: a rigid sleeve member interposed between the resilient member and the sliding member, and having an outer flange extending radially outwardly from at least one of axial ends thereof and a cylindrical portion extending axially outwardly from the circumferential edge of the outer flange; a retainer member located at one of axial ends of the inner sleeve corresponding to the above-identified at least one axial end of the rigid sleeve member; and a sealing means for sealing between at least the rigid sleeve member and the retainer member, the sealing means including a rubber member which is disposed on the inner surface of the cylindrical portion of the rigid sleeve member and which abuts against the circumferential surface of the retainer member.

In the bush assemblages according to the last two aspects of invention, both the sealing rubber member and the sealing means do not suffer from a radial-directional load which acts between the inner sleeve and the outer sleeve, whereby wearing of the sealing means or sealing rubber member is reduced to a minimum. This in turn prolongs the durability of such sealing means and sealing rubber member and maintains their sealing effect semi-permanently. Another merit resides in that no relative position change in the radial direction can take place between the rigid sleeve member and the retainer member, and it ensures constant sealing, irrespective of load change in the radial direction. The sliding member of such bush assemblage is interposed between the rigid sleeve member of comparatively high rigidity and the inner sleeve, and is thereby well protected by the two, so it is not susceptible to deformation and/or cracking due to vibration load from outside, whereby effective reduction of the rotation resistance and life elongation of the device are achieved.

BRIEF DESCRIPTION OF THE DRAWINGS

The foregoing and other objects, features and advantages of the present invention will be better understood from reading the following detailed description of preferred embodiments of the invention, when considered in conjunction with the accompanying drawings, in which.

DETAILED DESCRIPTION OF THE PREFERRED EMBODIMENTS

To further clarify the concept of the present invention, a few preferred embodiments of the invention will be described in detail by reference to the accompanying drawings.

Figure 1:
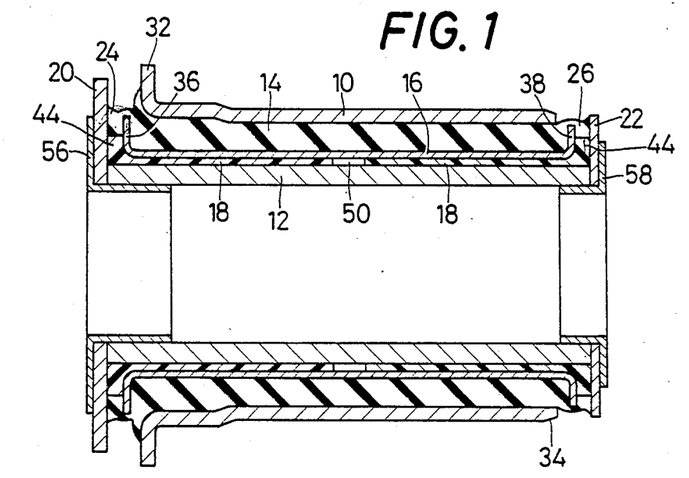
FIG. 1 is an elevational view in longitudinal cross section of a bush assemblage embodying the present invention.

Referring first to FIG. 1, there is shown a bush assemblage according to the present invention in an elevational view in longitudinal cross section. In this figure reference numeral 10 designates an outer metal sleeve of cylindrical shape, and at the innermost inside of the outer sleeve 10 an inner metal sleeve 12 of cylindrical shape is disposed coaxially or concentrically with the outer sleeve 10. Between the outer sleeve 10 and the inner sleeve 12 a cylindrical rubber block 14, as a cylindrical resilient member, is interposed. Between the inner sleeve 12 and the rubber block 14, a metallic sleeve 16 of rather high rigidity and a pair of bushes 18, 18 made of oil-containing plastic material, for example, oil-containing polyacetal resin, for constituting a pair of sliding members, are in turn interposed. So as to complete the such bush assemblage, retainers 20, 22 are disposed respectively at each end of the inner sleeve 12, and between retainers 20, 22 and respective ends of the metallic sleeve 16, sealing rubbers 24, 26 are respectively inserted.

Figure 2:
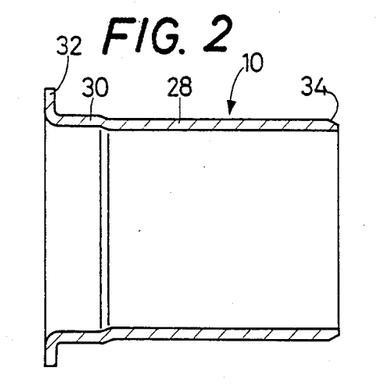
FIG. 2 is an elevational view in longitudinal cross section of an outer sleeve used in the bush assemblage in FIG. 1.
Figure 3:
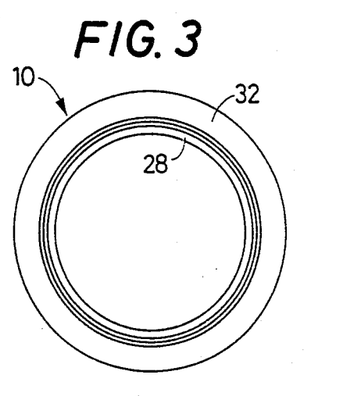
FIG. 3 is a right-hand side end elevation of the outer sleeve of FIG. 2.

The outer sleeve 10 is, as clearly shown in FIGS. 2 and 3, made into a stepped cylindrical body having a small-diameter portion 28 and a large-diameter portion 30. One end of the outer sleeve 10 on the side of the large-diameter portion 30 is formed into a radially outwardly extending flange 32, and the other end of the outer sleeve 10 is formed into a tapered surface 34, for making it easy to insert the bush assemblage into a predetermined attaching hole (not shown) in a control arm on a suspension or the like.

Figure 4:
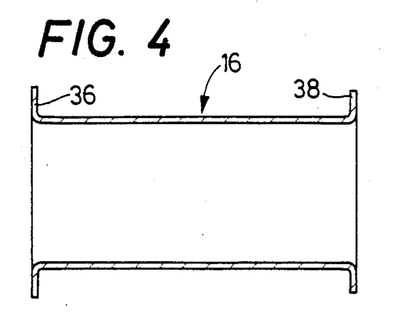
FIG. 4 is an elevational view in longitudinal cross section of a rigid sleeve used in the bush assemblage in FIG. 1.
Figure 5:
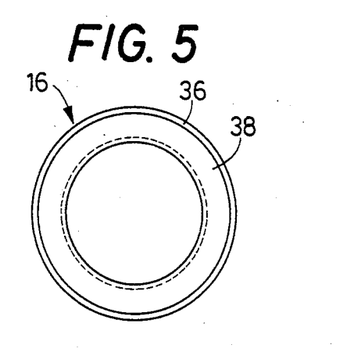
FIG. 5 is a right-hand side end elevation of the rigid sleeve of FIG. 4.

The metallic sleeve 16 is formed into a cylindrical body with a smaller diameter than that of the outer sleeve 10, and with a slightly longer axial length than that of the outer sleeve 10. On the ends, thereof outer flanges 36, 38, radially outwardly extending, are respectively formed. On the axially external surface of each outer flange 36, 38, the earlier mentioned sealing rubber 24, 26 is formed to be stuck thereon. The outer flange 36 of the metallic sleeve 16 is made of slightly larger diameter than the other outer flange 38, and the outer flange 36 is situated, when the bush assemblage is built up, on the side of the large-diametered portion 30 of the outer sleeve 10.

Figure 6:
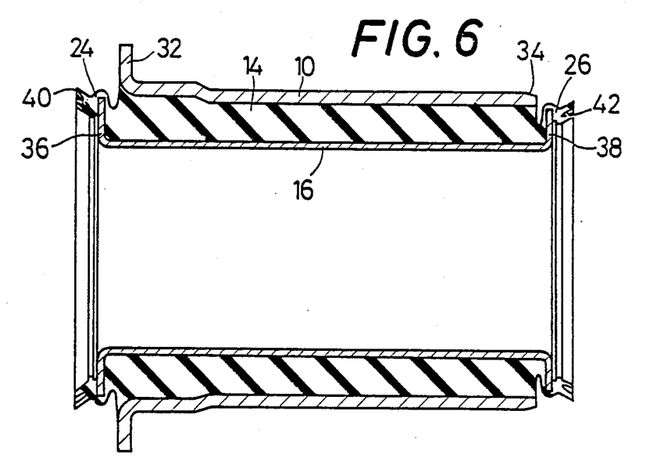
FIG. 6 is an elevational view in longitudinal cross section of an outer assembly unit, in the bush assemblage in FIG. 1, produced by forming a resilient member through vulcanization between the outer sleeve and the rigid sleeve.

The outer sleeve 10 and the metallic sleeve 16 are arranged concentrically, and the afore-mentioned rubber block 14 is interposed therebetween. The rubber block 14 is preferably formed, in an annular vacant space which is formed by the concentric arrangement of the two members as is shown in FIG. 6, by means of vulcanizing a certain predetermined rubber material there on the spot. By doing so the rubber block 14 can be advantageously stuck or adhered on the inner surface of the outer sleeve 10 and the outer surface of the metallic sleeve 16 simultaneously of the vulcanizing operation, and the outer sleeve 10, the metallic sleeve 16, and the rubber block 14 can be made into an integral body to provide an outer assembly unit. Then, the outer sleeve 10 of the prepared outer assembly unit is subjected to a commonly practiced shrink drawing or reducing operation by means of a drawing die or dies, which will impart preliminary pressure to the rubber block 14 and help to firmly unite the three members.

In this embodiment the sealing rubbers 24, 26 are also, at the time of vulcanization of the rubber block 14, simultaneously formed therewith into an integral body. The sealing rubbers 24, 26 are respectively stuck or adhered, while being formed, onto the axially outer surface of each outer flange 36, 38. The sealing rubbers 24, 26 are respectively provided with, in the axially outer surface, i.e., in the surface at which they are abutted onto the retainer 20, 22, an annular V-shaped groove 40, 42 for fully enhancing the sealing effect. It is however permissible to form by vulcanization the sealing rubbers 24, 26 separately from the rubber block 14 and of different material. It is also permissible, on the contrary, to integrally form the rubber block 14 and the sealing rubbers 24, 26 before adhering them all at once onto the outer sleeve 10 and the metallic sleeve 16 and then secure them to the two members with an adhesive or the like.

Figure 7:
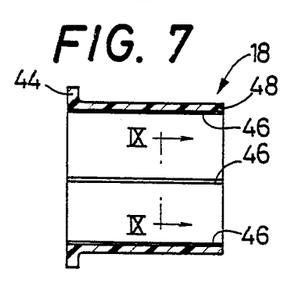
FIG. 7 is an elevational view in longitudinal cross section of the bush as a sliding member in the bush assemblage in FIG. 1.
Figure 8:
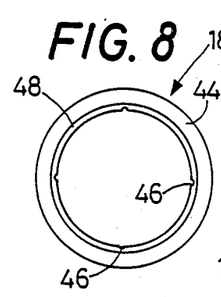
FIG. 8 is a right-hand side end elevation of the bush of FIG. 7.
Figure 9:
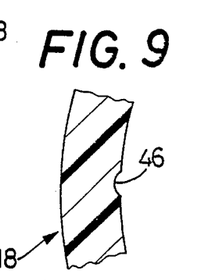
FIG. 9 is an enlarged view in cross section taken along line IX—IX of FIG. 7.

On the other hand, the bushes 18, 18 are both, as illustrated in FIGS. 7-9, of cylindrical form having an outer diameter substantially similar to the inner diameter of the metallic sleeve 16. They are further provided respectively with, on one end thereof, a radially outwardly extending outer flange 44, and also four axial grooves 46, on the inner surface thereof, running with an equal angular interval from each other in the circumferential direction. Both of these bushes 18, 18 are press-fit into the inner side of the metallic sleeve 16, headed by the end 48 thereof where the outer flange 44 is not formed, until the outer flange 44 abuts on the end of the metallic sleeve 16. They are both fixed on the metallic sleeve 16, leaving however a gap of axially predetermined length between the two ends 48, 48. The outer diameter of the outer flange 44 of the bush 18 is made smaller than the outer diameter of either outer flange 36, 38 of the metallic sleeve 16, so that the sealing rubbers 24, 26 may be respectively abutted to the retainers 20, 22 by being stuck respectively on the external circumferential surface of the outer flange 36, 38 (see FIG. 1).

Figure 10:
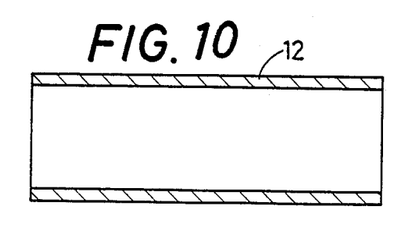
FIG. 10 is an elevational view in longitudinal cross section of an inner sleeve used in the bush assemblage in FIG. 1.
Figures 11, 13:
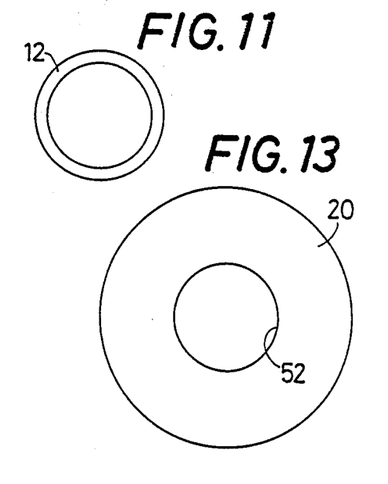
FIG. 11 is a right-hand side end elevation of the inner sleeve of FIG. 10.
FIG. 13 is a plan view of the retainer in FIG. 12.
Figure 12:
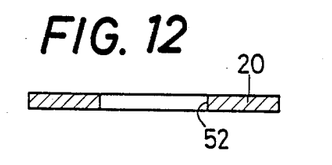
FIG. 12 is a sectional view of one retainer on one side of the bush assemblage in FIG. 1.

The outer diameter of the inner sleeve 12 is made, as is clearly shown in FIGS. 10 and 11, equal to or slightly smaller than the inner diameter of the bush 18, 18, and the axial length of the inner sleeve 12 is made equal to or slightly larger than the length between both ends of the pair of bushes 18, 18 when they have been press-fit along the inside of the metallic sleeve 16. The inner sleeve 12 is therefore inserted inside the bushes 18, 18 such that the outer circumferential surface thereof may be in contact with or extremely close to the inner circumferential surface of the bushes 18, 18, thereby permitting relative rotation or sliding between the inner sleeve 12 and the bushes 18, 18. A suitable inner shaft (not shown) is inserted through the inside of the inner sleeve 12, and is attached, by way of a suitable supporting member such as a bracket, to the side of a car body.

As a result of insertion of the inner sleeve 12 inside the pair of bushes 18, 18, a gap between the ends 48, 48 of bushes 18, 18 will form, by being confined by the inner sleeve 12 and the metallic sleeve 16 from either side, an annular hollow space 50. This space 50 can be advantageously used as a reservoir for a lubricant such as rubber grease by putting it in before the insertion of the inner sleeve 12, or in some cases the space 50 may be a place to accommodate a surplus of the lubricant smeared on the slidable surface of the bushes 18, 18 and the inner sleeve 12. Anyway such an annular hollow space 50 can contribute, by functioning as a reservoir of the lubricant for lubricating the whole sidable surfaces of the inner sleeve 12 and the bushes 18, 18, to making the relative rotation therebetween smooth and alleviating the friction therebetween. The longitudinal grooves 46 formed on the internal circumferential surface of the bushes 18 can also contribute to facilitation of the lubricant's movement in the axial direction, which greatly helps the lubricant reach easily even as far as a far distant place from the space 50. This space 50 should have a size large enough for satisfactorily functioning as an oil reservoir of this sort, which naturally determines the axial length of the pair of bushes 18, 18 when designing them.

The retainers 20, 22 to be attached to either axial end of the inner sleeve 12 are of doughnut shape, and have respectively circular holes 52, 54 in the center thereof with a substantially equal internal diameter as that of the inner sleeve 12, as can be clearly seen in FIGS. 12-15. The external diameter of the retainers 20, 22 is made respectively larger than that of the outer flanges 36, 38. The retainers 20, 22 are respectively attached to the inner sleeve 12 by way of collars 56, 58, which are constituted of cylindrical portions 60, 62, with an external diameter nearly as large as the internal diameter of the inner sleeve 12, and outer flanges 64, 66 which are radially outwardly extending respectively from one end of the cylindrical portions 60, 62. The cylindrical portions 60, 62 are inserted into the inside of the inner sleeve 12 at either end portion thereof so as to fix the retainers 20, 22 to either end portion of the inner sleeve 12.

When inserting the cylindrical portions 60, 62 into the inside of the inner sleeve 12, the outward end of the sealing rubbers 24, 26 stuck on the outer flange of the metallic sleeve 16 are respectively abutted on the inner side surface of the retainers 20, 22 and are deformed under pressure between the outer flange 36, 38 and the retainer 20, 22 respectively. It brings about effective sealing between the outer flanges 36, 38 and the retainers 20, 22 so as to prevent ingress of dirt, sand, mud water, etc., into the bush assemblage. The retainers 20, 22 are situated very closely face to face or in contact with the outer flanges 44, 44 of the pair of bushes 18, 18 on either end of the bush assemblage, for permitting the relative rotation of the retainers 20, 22 and the outer flanges 44, 44.

Passing through the inside of the inner sleeve 12 of the bush assemblage, the inner shaft is inserted for being mounted, as a front bush, rear bush, or lower bush, to a control arm, such as an A-arm or I-arm of the suspension on the side of the car body.

Since ingress of dirt, sand grains, mud water, etc., is effectively prevented in a bush assemblage of such a construction, due to effective sealing between both ends of the metallic sleeve 16 and the retainers 20, 22 with the sealing rubbers 24, 26, the relative rotation between the pair of bushes 18, 18 secured to the metallic sleeve 16 and the inner sleeve 12 can be substantially freed from damage caused by the aforementioned ingress of dirt, sand grains, mud water, etc. Formation of the V-shape grooves 40, 42 in the sealing rubbers 24, 26, and surface contact of the sealing rubbers 24, 26 onto the retainers 20, 22 under pressure, ensure the sealing effect. Interposing of the outer flanges 44, 44 of the bushes 18, 18 between the outer flanges 36, 38 of the metallic sleeve 16 and the retainers 20, 22, wherein the sealing rubbers 24, 26 are respectively mounted, prevents a relative position change between the outer flanges 36, 38 and the retainers 20, 22, which consequently prevents elastic deformation of the sealing rubbers 24, 26 owing to an axial load input, i.e., constantly maintains good sealing effect. It naturally elongates the life of the sealing rubbers 24, 26. When the sealing rubbers 24, 26 are, like in this embodiment, integrally formed by vulcanization at one time, an extra process of making the sealing rubbers 24, 26 can be meritoriously eliminated in the course of building up or assembling the bush assemblage.

Since the bushes 18, 18 are press-fit into the inside of the metallic sleeve 16, the latter functions as a resisting member for preventing the bushes 18, 18 from being deformed or cracked owing to a vibration load from outise. it maintains the bushes 18, 18 at a high degree of roundness, and thereby ensures effective reduction of the twisting spring action. By enhancing at the same time durability against heat or the like, it contributes to life elongation of the bush assemblage.

The hollow space 50, formed between the ends 48, 48 of the bushes 18, 18 functions as a reservoir of the lubricant such as rubber grease, so as to gradually lubricate the sliding surfaces of the bushes 18, 18 and the inner sleeve 12. It not only effectively mitigates wearing of the sliding members but also further enhances the mitigating effect of the twisting spring action caused by the bushes 18, 18. In particular, the axially longitudinal grooves 46 formed on the internal circumferential surface of the bushes 18, 18, in this embodiment, makes the above-mentioned effect even more remarkable due to the thorough lubrication even as far as the remotest place from the hollow space 50.

Figures 14, 15, 16, 17, 18, 19, 20, 21, 22:
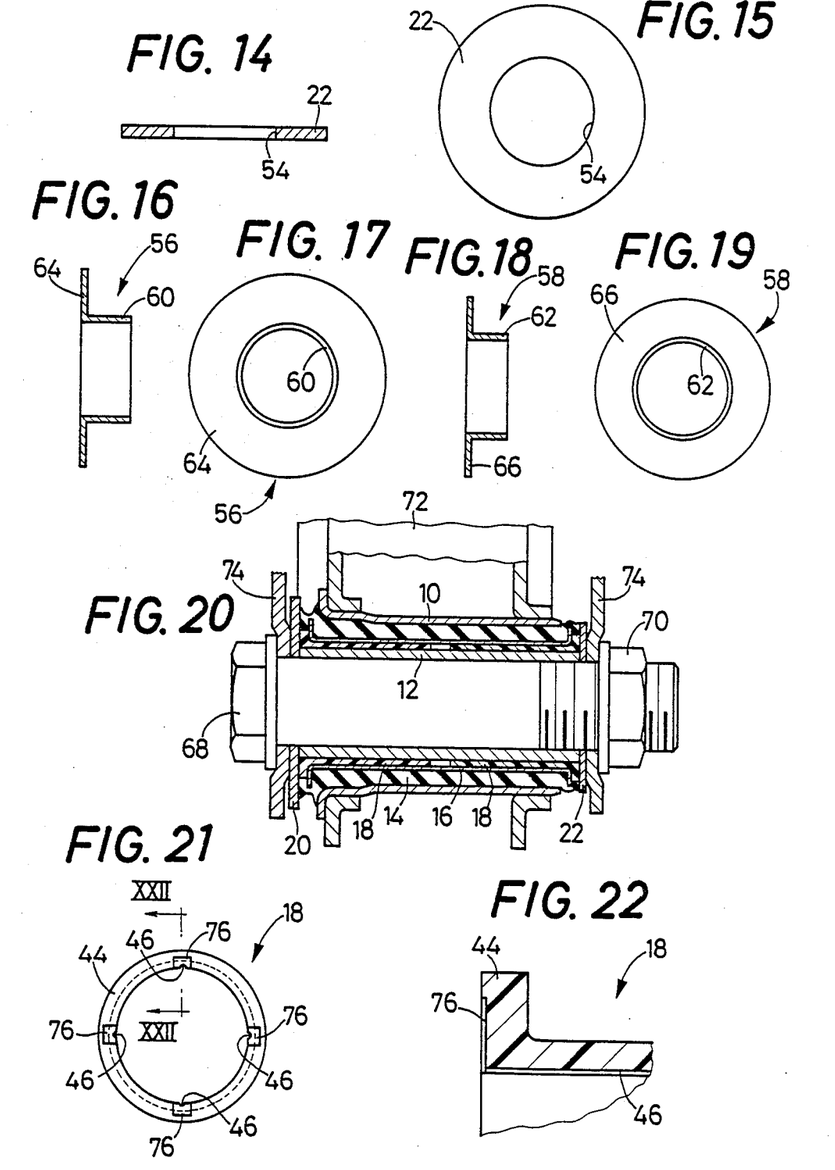
FIG. 14 is a sectional view of the other retainer on the other side of the bush assemblage in FIG. 1.
FIG. 15 is a plan view of the retainer in FIG. 14.
FIG. 16 is an elevational view in longitudinal cross section of one collar on one side of the bush assemblage in FIG. 1.
FIG. 17 is a right-hand side end elevation of the collar of FIG. 16.
FIG. 18 is an elevational view in longitudinal cross section of the other collar on the other side of the bush assemblage in FIG. 1.
FIG. 19 is a right-hand side end elevation of the other collar of FIG. 18.
FIG. 20 is an elevational view in longitudinal cross section of another embodiment of this invention for explaining the state of attachment to a predetermined shaft.
FIG. 21 is a left-hand side end elevation of another bush as a sliding member used in the embodiment of FIG. 1.
FIG. 22 is an enlarged view in cross section taken along line XXII—XXII of FIG. 21.

In place of the collars 56, 58 with which the retainers 20, 22 are attached to either end of the inner sleeve 12, in this embodiment, the retainers 20, 22 may be attached by threading a nut 70 to a predetermined shaft or mounting bolt 68 as shown in FIG. 20. In this figure numeral 72 designates a suspension arm and 74 designates a bracket secured to a member (not shown) on the side of the car body. It is also permissible to utilize the bracket 74 as a retainer 20, 22 on either end of the bush assemblage.

Although in the above embodiment four axially longitudinal grooves 46 are formed only on the internal circumferential surface of the bushes 18, 18, four recesses 76 may be additionally formed on the axially external circumferential surface of the outer flanges 44, 44 in alignment with each of the four grooves 46, as shown in FIGS. 21 and 22, which will make lubrication between the outer flanges 44, 44 and the retainers 20, 22 far better. The recesses 76 need not to be formed in alignment with the grooves 46. The recesses can function by themselves, independent from the grooves 46, as an oil reservoir just like the hollow space 50.

Embodiments of the invention have been described above in detail with reference to the drawings, this invention can however be reduced to many different modes.

In the above embodiment, for example, the sealing rubbers 24, 26 are integrally formed with the rubber block 14 for being stuck on the sleeve 16. They may be, however, separately formed from the rubber block 14 for being optionally stuck on either the sleeve 16 or each of the retainers 20, 22. Even if the V-grooves 40, 42 formed on the outer ends of the sealing rubbers 24, 26 are omitted, the aimed sealing effect can be attained by and large.

The bushes 18, 18 in the above described embodiment are made relatively rotatable with the inner sleeve 12, but it is not the only possible structure. Other alternatives are permissible. For example, the bushes 18, 18 may be fixed onto the inner sleeve 12 to provide relative rotation between the bushes and the metallic sleeve 16, and it is also possible to leave the bushes 18, 18 unfixed so as to allow them instead to freely rotate in relation to either the metallic sleeve 16 and the inner sleeve 12.

In the embodiments, the slidable members are constituted of the pair of bushes 18, 18 so as to form the hollow space 50 between both ends 48, 48 of the bushes 18, 18. It is however not absolutely essential to leave the hollow space 50. It is permissible to form the sliding member into one integral cylindrical body, in place of the separated two pieces.

In place of the pair of bushes 18, 18, constituting the sliding members, made of oil-containing plastic material, they can be of metallic material, such as oil-containing bearing alloy.

In the embodiments, on either end of the bush assemblage the sealing rubbers 24, 26 are respectively put inserted. It is also possible to omit one of either 24 or 26, when the bush assemblage is so built as to relieve one side end of ingress of any undesirable matter due to its special attaching position.

Referring further to FIGS. 23 through 30, there will be described preferred embodiments of the bush assemblage according to another aspect of the present invention.

Figure 23:
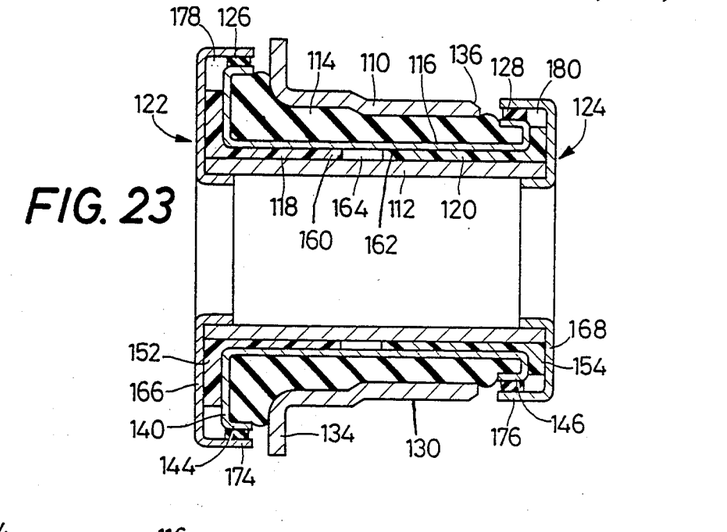
FIG. 23 is an elevational view in longitudinal cross section of another embodiment of a bush assemblage according to the present invention.

In the elevational view in longitudinal cross section of FIG. 23, reference numeral 110 designates an outer cylindrical sleeve of metallic material. At the innermost inside of the outer sleeve 110 an inner cylindrical sleeve 112 of metallic material is concentrically placed therewith. Between those two sleeves (110, 112) a cylindrical rubber block 114, as a cylindrical resilient member, is interposed. Between the rubber block 114 and the inner sleeve 112, a metallic sleeve 116 of relatively high rigidity, as a rigid sleeve member, and a pair of cylindrical members 118, 120, or bushes of oil-containing polyacetal resin material, constituting a sliding member, are respectively interposed. On the ends of the inner sleeve 112, retainers 122, 124 of substantially U-letter form in section are respectively attached to build up the bush assemblage. Between the retainers 122, 124 and the end of the metallic sleeve 116 annular sealing rubbers 126, 128 are inserted on the ends of the bush assemblage.

Figures 24, 25, 26:
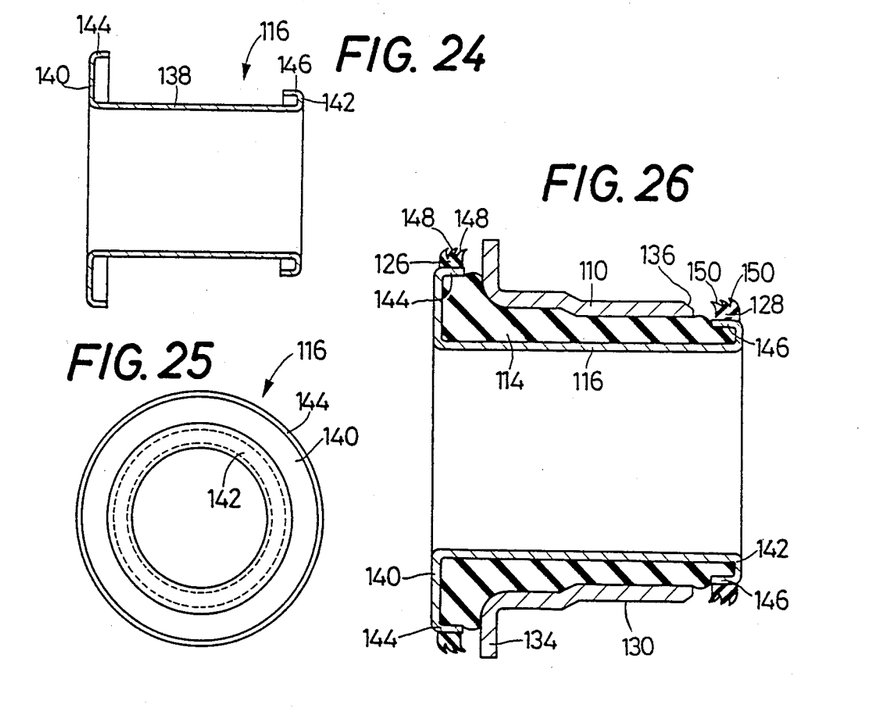
FIG. 24 is an elevational view in longitudinal cross section of a rigid sleeve used in the bush assemblage in FIG. 23.
FIG. 25 is a right-hand side end elevation of the rigid sleeve of FIG. 24.
FIG. 26 is an elevational view in longitudinal cross section of an outer assembly unit produced by vulcanizing formation of a resilient member executed between an outer sleeve and the rigid sleeve in the bush assemblage in FIG. 23.
Figure 27:
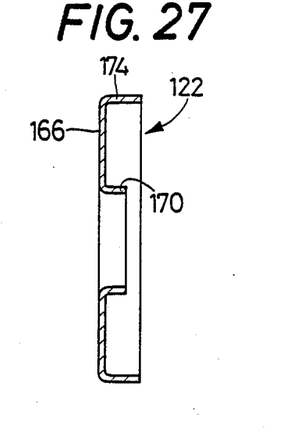
FIG. 27 is an elevational view in longitudinal cross section of one retainer in the bush assemblage in FIG. 23.
Figure 28:
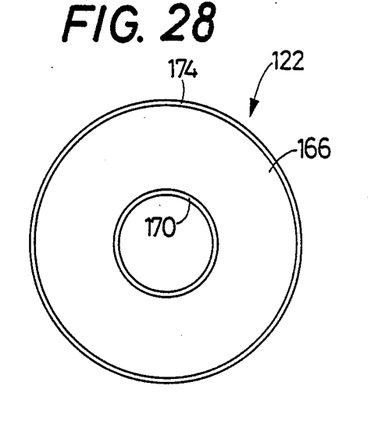
FIG. 28 is a right-hand side end elevation of the retainer of FIG. 27.
Figure 29:
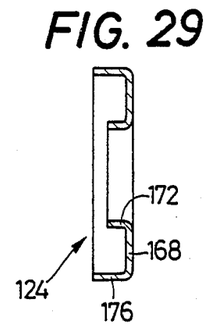
FIG. 29 is an elevational view in longitudinal cross section of the other retainer in the bush assemblage in FIG. 23.
Figure 30:
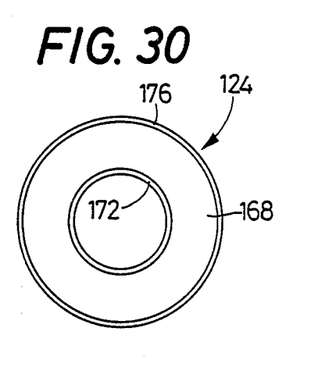
FIG. 30 is a left-hand side end elevation of the other retainer of FIG. 29.

The metallic sleeve 116 is composed of, as shown in FIGS. 24 and 25, a cylindrical portion 138 which is of smaller diameter and of larger axial length than the outer sleeve 110, outer flanges 140, 142 respectively extending from the ends of the cylindrical portion 138 in a radial and outward direction, and two large-diameter cylindrical portions 144, 146, axially extending respectively from the outer circumferential edge of the outer flanges 140, 142 towards the opposite end. The outer diameter of one outer flange 140 is larger than that of the other outer flange 142, and the former is positioned, when the bush assemblage is built up or assembled, on the side of an outer flange 134 of the outer sleeve 110. The outer diameter of the other outer flange 142 is made smaller than the inner diameter of a small-diameter portion 130 of the outer sleeve 110.

The outer sleeve 110 and the metallic sleeve 116 are concentrically arranged, and the rubber block 114 is interposed therebetween. It is desirable that the outer sleeve 110 and the metallic sleeve 116 be concentrically arranged first, and then predetermined rubber material be vulcanized in an annular vacant space between the two members so as to form the rubber block 114 there while filling up the space at one time. The rubber block 114 will be stuck or adhered, while being vulcanized, to the internal surface of the outer sleeve 110 and the external surface of the metallic sleeve 116, so as to make the three members, i.e., outer sleeve 110, the metallic sleeve 116, and the rubber block 114, into one integral body to provide an outer assembly unit. A drawing process subjected thereafter on the outer sleeve 110 will impart preliminary compression to the rubber block 114 and bond the three members more firmly.

In this embodiment, however, the sealing rubbers 126, 128 are, separately from the vulcanizing formation of the rubber block 114, formed by vulcanization while being stuck of adhered on the outer circumferential surface of the large-diameter cylindrical portions 144, 146 respectively. On the outer circumferential surface of the sealing rubbers 126, 128 a plurality of circumferential grooves 148, 150 are formed for fully enhancing sealing effect. The sealing rubbers 126, 128 can also be integrally formed with the rubber block 114, by means of forming some notches or recesses on the large-diameter cylindrical portions 144, 146. They may be separately formed before they are stuck or adhered on the outer circumferential surface of the large-diametered cylindrical portions 144, 146 with an adhesive or the like.

The pair of cylindrical members, i.e., bushes 118, 120 are of cylindrical form, having almost the same size outer diameter as the inner diameter of the metallic sleeve 116, and they have respectively on one end thereof radially outwardly extending outer flanges 152, 154, and also have on their inner circumferential surfaces four axial grooves 156 (FIGS. 31 and 32) with an equal angular interval in the circumferential direction from each other. They are respectively press-fit inside the metallic sleeve 116, being led by the non-flanged end thereof, until the outer flanges 152, 154 abut on the ends of sleeve 116, where they are fixed. The pair of bushes 118, 120 are so designed as to leave a hollow space of a predetermined size between the ends thereof. When they are press-fit, the bush 118 is press-fit on the side of the outer flange 140 of the sleeve 116, and its outer flange 152 is larger than the outer flange 154 of the bush 120, in harmony with the larger outer flange 140 of the sleeve 116 on one side than the other outer flange 142 on the other side, while the axial length thereof is smaller than that of the bush 120.

When the inner sleeve 112 is inserted inside the bushes 118, 120, a gap between the two ends 160, 162 of the bushes 118, 120 is formed into an annular hollow space 164, being confined by the inner sleeve 112 and the sleeve 116, from both flanks. This space 164 is serviceable as a reservoir for lubricant such as rubber grease which is put in before the inner sleeve 112 is inserted, or as a pool for lubricant smeared over the sliding surfaces of the bushes 118, 120 and the inner sleeve 112. Anyway, the hollow space 164 of such a style can function as an oil reservoir for lubricant lubricating the sliding surfaces of the bushes 118, 120 and the inner sleeve 112. It greatly contributes to a good relative rotation of the two members and thereby to wear mitigation of both. The axial grooves on bushes 118, 120 are, in cooperation with the hollow space 164, serviceable to spread lubricant even to ends remote from the hollow space 164. The hollow space 164 must therefore be large enough for this object as the oil reservoir, which determines the length of the bushes 118, 120 when they are designed, e.g., to leave a satisfactory sized space.

On the ends of the inner sleeve 112, retainers 122, 124 are mounted for assembling the bush assemblage, which retainers are respectively of roughly U-letter shape in section, consisting of (as shown in FIGS. 27-30) circular disk portions 166, 168 of doughnut shape, inside cylindrical portions 170, 172, with an outer diameter almost equal to the inner diameter of the inner sleeve 112, extending from the inner circumferential edges of the circular disk portions 166, 168 in the perpendicular direction, and outside cylindrical portions 174, 176 extending from the outer circumferential edges of the circular disk portions 166, 168 in the same direction as the inside cylindrical portions 170, 172. The outer diameter of the circular disk portions 166, 168 is respectively larger than that of the outer flanges 140, 142 of the sleeve 116. The lengths of the outside cylindrical portions 174, 176 are respectively determined such that the inner circumferential surfaces thereof can be positioned face to face with the outer circumferential surfaces of the large cylindrical portions 144, 146 of the sleeve 116 on either axial side.

The retainers 122, 124 are at their inner cylindrical portions 170, 172 press-fit inside the inner sleeve 112, from either end, for being fixed there. On the inner circumferential surfaces of the outside cylindrical portions 174, 176, which are placed face to face with the outer circumferential surfaces of the large-diameter cylindrical portions 144, 146, the sealing rubbers 126, 128 are respectively abutted and at the same time deformed under pressure between those two members faced to each other. Effective sealing is achieved between the outside cylindrical portions 174, 176 and the large-diameter cylindrical portions 144, 146, preventing consequently ingress of dirt, sand grains, and water, etc., between the sleeve 116 and the inner sleeve 112. Pressing deformation of the sealing rubbers 126, 128 between the outside cylindrical portions and the large-diameter cylindrical portions 144, 146 will diminish the thickness of the sealing rubbers 126, 128 under compression, which thereby enhances the sealing effect.

The disk portions 166, 168 of the retainers 122, 124 are, due to the fact that the length of the inner sleeve 112 is made equal to, or slightly larger than, that between both ends of the pair of bushes 118, 120 press-fit inside the sleeve 116, respectively placed face to face with the outer flanges 152, 154, in contact with or closely approaching same. Relative rotation between the disk portions 166, 168 of the ratainers 122, 124 and the outer flanges 152, 154 of the sleeve 116 is therefore permitted. And on the radially outer sides of the outer flanges 152, 154 of the bushes 118, 120 annular hollow spaces 178, 180 (FIG. 23) are formed, which function just like the aforementioned hollow space 164 as an oil reservoir. This provides not only good lubrication between retainers 122, 124 and bushes 118, 120, but also more effective sealing between the outside cylindrical portions 174, 176 and the large-diameter cylindrical portions 144, 146, owing to the enclosing of oil in the annular hollow spaces 178, 180. The fact that the hollow space 164 is situated a little nearer to the side of the retainer 122 is reasonable for imparting good lubrication to that side, where the sliding area is larger in comparison with the side of the retainer 124, i.e., between the retainer 122 and the outer flange 152.

In a bush assemblage of such a structure, a gap between the large-diameter cylindrical portions 144, 146 and the outside cylindrical portions 174, 176 is sealed with the sealing rubbers 126, 128, which effectively prevents dirt, said grains, mud water, etc., from entering between the sleeve 116 and the inner sleeve 112. The relative rotation between those members by way of the bushes 118, 120 prevents spoiling or harming caused by the ingrees of the aforementioned undesirable matter. Since the sealing rubbers 126, 128 are disposed on the outer circumferential surface of the large-diametered cylindrical portions 144, 146 of the sleeve 116, and are also abutted under pressure on the inner circumferential surfaces of the outside cylindrical portions 174, 176 of the retainers 122, 124 good sealing effect is assured even when both, i.e., the retainers 122, 124 and the sleeve 116, are relatively rotated. If and when the bush assemblage is placed under a radial load, the large-diameter cylindrical portions 144, 146 and the outside cylindrical portions 174, 176 are protected from a relative position change in the radial direction, which guarantees a constant sealing effect and reduction of the wear of the sealing rubbers 126, 128 to a minimum, e.g., life elongation of same. Formation of a plurality of circumferential grooves 148, 150 on the sealing rubbers 126, 128, and the surface contact between the sealing rubbers 126, 128 and the outside cylindrical portions 174, 176 under pressure, ensure and enhance good sealing effect there.

As the bushes 118, 120 are press-fit inside the sleeve 116, the latter functions as a guard or resistor for the former, which prevents the bushes 118, 120 from being deformed or cracked due to vibration load from outside. The bushes 118, 120 are allowed to maintain a high degree of roundness, thereby maintaining the twisting spring action reducing effect. It also enhances resistivity against heat, etc., and prolongs the life of the device itself.

In this embodiment, between ends 160, 162 of the bushes 118, 120, and on the radially outer side of the outer flanges 152, 154, hollow spaces 164, 178 and 180 are respectively formed for functioning as reservoirs of lubricant. Lubricant such as rubber grease can be smeared to every corner of the sliding surface between the bushes 118, 120 and the inner sleeve 112 as well as between the bushes 118, 120 and the retainers 122, 124, and wearing of the related members is thereby remarkably reduced. and Furthermore, reduction of the twisting spring action by virtue of the bushes 118, 120 is also enhanced. The axial grooves formed on the inner circumferential surface of the bushes 118, 120 advantageously cooperate with the hollow space 164 in bringing the lubricant as far as most remote place from the hollow space 164.

Figure 31:
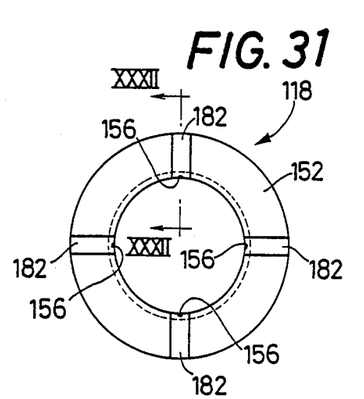
FIG. 31 is a left-hand side end elevation of another bush as a sliding member used in the embodiment of FIG. 23.
Figure 32:
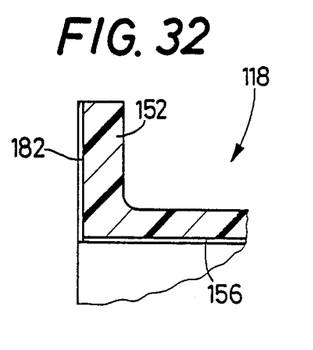
FIG. 32 is an enlarged view in cross section taken along line XXXII—XXXII of FIG. 31.

Although the axial grooves are, in this embodiment, limited to the inner circumferential surface of the bush 118, if on the axially external surface of the outer flange 152 four similar grooves 182 are also formed in alignment with the axial grooves 156 so as to make them communicate with the annular hollow space 178 as shown in FIGS. 31 and 32, the sliding portion between the outer flange 152 and the retainer 122 will be better lubricated. The alignment of the grooves 182 with the grooves 156 is however not essential; mere connection of the grooves 182 with the annular hollow space 178 will allow similar lubricating effect. It goes without saying that similar grooves formed on the outer flange 154 of the other bush 120 gives good lubrication between the outer flange 154 and the other retainer 124.

In this embodiment, for example, the sealing rubbers 126, 128 are respectively disposed on the outer circumferential surfaces of the large-diameter cylindrical portions 144, 146; however, the sealing rubbers safely can be disposed on the inner circumferential surfaces of the outside cylindrical portions 174, 176.

Even when the grooves 148, 150 formed on the outer circumferential surfaces of the sealing rubbers 126, 128, in this embodiment, are omitted, the sealing effect by the sealing rubbers 126, 128 can be attained by and large.

In this embodiment, the bushes 118, 120 are placed in relative rotation with the inner sleeve 112. However modification is possible. That is to say, the bushes 118, 120 can be fixed on the inner sleeve 112 leaving the sleeve 116 relatively rotatable with respect to the bushes 118, 120, or the bushes 118, 120 can be unfixed, thereby leaving them relatively rotatable with respect to both the sleeve 116 and the inner sleeve 112.

Referring further to FIGS. 33–36, preferred embodiments of a bush assemblage will be described according to yet a further aspect of the invention.

Figure 33:
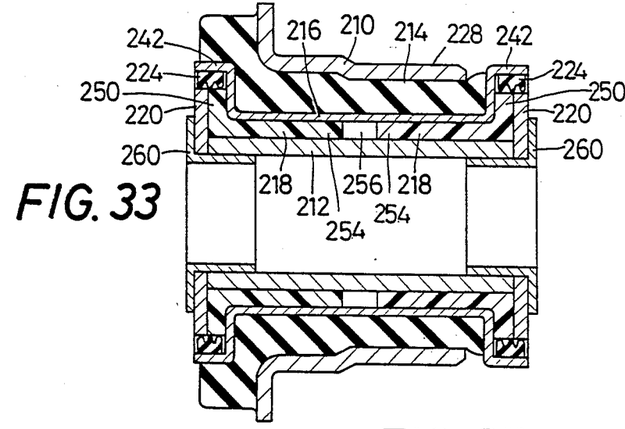
FIG. 33 is an elevational view in longitudinal cross section of yet another embodiment of a bush assemblage according to the present invention.

In the elevational view in longitudinal cross section of FIG. 33, reference numeral 210 designates a metallic outer cylindrical sleeve. In the innermost inside thereof an inner cylindrical sleeve 212 of metallic material is concentrically arranged. Between the outer cylindrical sleeve 210 and the inner cylindrical sleeve 212 a rubber block 214 as a resilient member is interposed, and between the rubber block 214 and the inner sleeve 212 a metallic sleeve 216, as a rigid sleeve of relatively high rigidity, and a pair of cylindrical members 218, 218, constituting sliding members, of oil-containing polyacetal resin, are interposed. For assembling the bush assemblage of this sort, retainers 220, 220 are mounted at the ends of the inner sleeve 212. Between the retainers 220, 220 and the end of the sleeve 216 annular sealing rubbers 224, 224 are respectively arranged.

Figure 34:
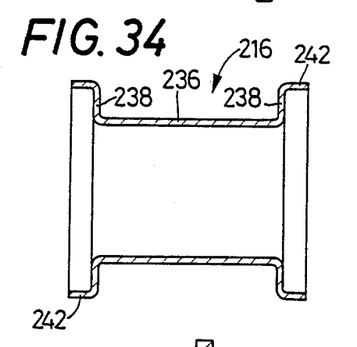
FIG. 34 is an elevational view in longitudinal cross section of a rigid sleeve used in the bush assemblage in FIG. 33.
Figure 35:
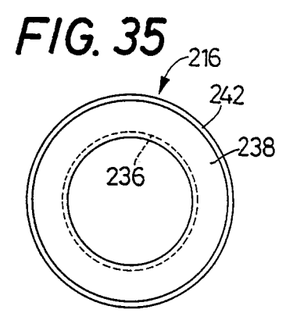
FIG. 35 is a right-hand side end elevation of the rigid sleeve of FIG. 34.
Figure 36:
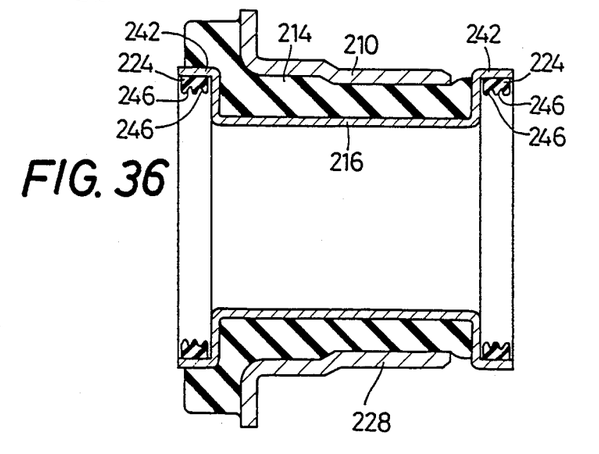
FIG. 36 is an elevational view in longitudinal cross section of an outer assembly unit produced by vulcanizing formation of a resilient member on the spot between an outer sleeve and the rigid sleeve, in the bush assemblage in FIG. 33.

The sleeve 216 is, as shown in FIGS. 34 and 35, composed of a cylindrical portion 236, of smaller diameter and of slightly larger length than the outer sleeve 210, outer flanges 238, 238 radially outwardly extending from the ends of the cylindrical portion 236, and cylindrical extensions 242, 242 axially outwardly extending from the external circumferential edges of the outer flanges 238, 238.

Those two members, i.e., the outer sleeve 210 and the metallic sleeve 216, are concentrically arranged, with the rubber block 214 being interposed therebetween, to provide an outer assembly unit. It is preferble that a predetermined rubber material be, in an annular vacant space formed by the concentrical arrangement of the outer sleeve 210 and the metallic sleeve 216, vulcanized on the spot to form the rubber block 214. By doing so, the rubber block 214 is in the course of vulcanization stuck to the inner circumferential surface of the outer sleeve 210 and the outer circumferential surface of the metallic sleeve 216, so as to make three members, the outer sleeve 210, the metallic sleeve 216 and the rubber block 214, into one integral body. When drawing operation is thereafter applied to the outer sleeve 210, the rubber block 214 receives a preliminary compression and the three members, i.e., the outer sleeve 210, the metallic sleeve 216, and the rubber block 214, are bonded more firmly. Although the inner diameter of the small-diameter portion 228 of the outer sleeve 210 is, in FIGS. 33 and 36, indicated smaller than the outer diameter of the cylindrical extension 242, 242 of the metallic sleeve 216, it is a result of the drawing process. Before the application of the drawing, the metallic sleeve 216 can be inserted inside the outer sleeve 210.

In this embodiment, the sealing rubbers 224, 224 are also vulcanized at the same time as the vulcanization of the rubber block 214, although separated from the latter, for being struck in the course of the vulcanizing process on the inner circumferential surface of the cylindrical extensions 242, 242 respectively. On the inner circumferential surfaces of the sealing rubbers 224, 224, a plurality of grooves 246 are formed in the circumferential direction for the purpose of enhancing the sealing effect. Those sealing rubbers 224, 224 can be, by means of forming notches, etc., in the outer flanges 238, 238, integrally formed with the rubber block 214, or they may be formed as a separate body beforehand for being adhered on the inner circumferential surface of the cylindrical extensions 242, 242 with adhesive or the like.

On the other hand, the above-mentioned cylindrical member or bushes 218, 218 are all of cylindrical form having an outer diameter of almost the same size as the inner diameter of the sleeve 216. The bushes 218 are provided on one end thereof with radially outwardly extending outer flanges 250, and on the inner circumferential surfaces with four axial grooves (not shown) with equal circumferential angular intervals from each other. These two bushes 218, 218 are respectively press-fit inside the sleeve 216, being led by the non-flanged end, until the outer flanges 250 abut the ends of the sleeve 216, where both are fixed on the sleeve 216. At this time between each end 254, 254 of the bushes 218, 218 a hollow space 256 of a predetermined length is to be left. The outer diameter of the outer flanges 250 of the bushes 218 is smaller than the inner diameter of the cylindrical extensions 242, 242, and the inner circumferential surfaces of the sealing rubbers 224, 224 are respectively abutted on the outer circumferential surfaces of the outer flanges 250 such that the sealing rubbers 224, 224 are respectively compressedly sandwiched between the inner circumferential surfaces of the cylindrical extensions 242 242 and the outer circumferential surfaces of the outer flanges 250, to be deformed. This effectively provides sealing between the cylindrical extensions 242, 242 and the outer flanges 250, with the desirable result of preventing the ingress of dirt, sand grains, mud water, etc., between the sleeve 216 and the bushes 218.

As a result of insertion of the inner sleeve 212 inside the bushes 218, 218, an annular hollow space 256 is formed between both ends 254, 254 of the pair of bushes 218, 218, by being confined by the inner sleeve 212 and the metallic sleeve 216 on either flank. This hollow space 256 functions as an oil reservoir, by enclosing lubricant such as rubber grease before the inner sleeve 212 is inserted, or as a pool for receiving the lubricant smeared over the sliding surfaces of the bushes 218, 218 and the inner sleeve 212. In either case this hollow space 256 can greatly serve to pool the lubricant smeared on the sliding surfaces of the bushes 218, 218 and the inner sleeve 212, and consequently can provide uniform and even smearing of the members, resulting in smooth relative rotation (sliding) between them and reduced wear of the sliding portions. Axial grooves (not shown) formed on the inner circumferential surfaces of the bushes 218, 218 also provide to lubricant transportation in the axial direction, which facilitates good lubrication even to axially remote places from the hollow space 256. Considering such function of the hollow space 256, the axial length of the bushes 218, 218 must be determined so as to leave a necessary gap between them for a well functioning as the oil reservoir.

On the ends of the inner sleeve 212, circular retainers 220, 220 are attached, of substantially doughnut form with a central hole, whose diameter is almost the same size as that of the inner sleeve 212, and whose outer diameter is almost the same size as that of the outer flanges 250 of the bushes 218. The sealing rubbers 224, 224 stuck on the cylindrical extensions 242, 242 can therefore be similarly stuck on the outer circumferential surfaces of the retainers 220, 220, which ensures effective sealing between the cylindrical extensions 242 and the retainers 220, too, preventing ingress of dirt, sand grains, mud water, etc. between the metallic sleeve 216 and the inner sleeve 212. The lateral length of the cylindrical extensions 242 is made larger than the sum of the thickness of the outer flanges 250 and the thickness of the retainers 220, and the sealing rubbers 224 are also made wide enough to completely cover, when abutted, both the outer circumferential surfaces of the outer flanges 250 and the retainers 220.

The retainers 220, 220 of such a form are attached to the inner sleeve 212 on either end with collars 260, 260, each of which is constituted of a cylindrical portion equal in size to the inner diameter of the inner sleeve 212, and an outer flange radially outwardly extending from one end of the cylindrical portion. By press-fitting of the cylindrical portions into the inner sleeve 212, the retainers 220 are fixed to the ends of the inner sleeve 212. The retainers 220, 220 are, in this fixed state, placed in contact with or very close to the outer flanges 250, 250 of the bushes 218, 218, permitting relative rotation therebetween.

In a bush assemblage of such a structure, sealing between the cylindrical extensions 242, 242 on the side, and the outer flanges 250, 250 and the retainers 220, 220 on the opposite side, is attained with the sealing rubbers 224, 224, so as to effectively prevent ingress of dirt, sand grains, mud water, etc., between the sleeve 216 and the inner sleeve 212, which protects relative rotation between those members from damage or trouble caused by the ingress of such undesirable matter. As the sealing rubbers 224 are disposed on the inner circumferential surfaces of the cylindrical extensions 242, and are abutted on both outer circumferential surfaces of the outer flanges 250 and the retainers 220 under pressure, good sealing can be ensured even when both members are placed under relative rotation. A radial load possibly applied on the bush assemblage will never cause radial relative position change of the cylindrical extensions 242, the outer flanges 250 and the retainers 220, which ensures constant sealing and reduces wear of the sealing rubbers 224 to a minimum, thereby enhancing the life thereof. The grooves 246 formed plurally on the sealing rubbers 224 in the circumferential direction, and surface contact under compression between the sealing rubbers 224 on one side and both the outer flanges 250 and the retainers 220 on the other side, serve in mutual cooperation thereof to obtain certain sealing.

As the bushes 218, 218 are press-fit into the metallic sleeve 216, the latter functions as a guard or protector for the former, preventing the bushes 218, 218 from deformation or cracking caused by any vibration load coming from outside. The bushes 218, 218 can thereby be round in section constantly, consequently ensuring reduction of the twisting spring action and at the same time enhancement of durability against heat. It serves to elongate the life of the bushes and the bush assemblage itself.

In this invention the hollow space 256 is formed as stated earlier between the ends 254, 254 of the bushes 218, 218 for functioning as an oil reservoir, gradually supplying lubricant such as rubber grease all over the sliding surfaces of the bushes 218, 218 and the inner sleeve 212. It advantageously results in an effective reduction of wear in those members and enhanced of reduction of the twisting spring action by virtue of the bushes 218, 218. Formation of the axial grooves on the inner circumferential surface of the bushes 218, 218 contributes to good lubrication even to places remote from the annular hollow space 256.

In the above embodiment, the sealing rubbers 224, which are abutted on both outer circumferential surfaces of the outer flanges 250 and the retainers 220, can be altered to abut only on the outer circumferential surfaces of the retainers 220.

It will be obvious that the present invention may be embodied with various other changes, modifications and improvements which may occur to those skilled in the art without departing from the scope of the invention defined in the appended claims.

What is claimed is:

1. A bush assemblage having an inner sleeve, an outer sleeve disposed around the inner sleeve in coaxial and radially-spaced relation therewith, a rigid sleeve member disposed between the inner and outer sleeves, and a cylindrical resilient member interposed between the outer sleeve and the rigid sleeve member, comprising:
    a retainer member located at at least one of axial ends of said inner sleeve to extend radially outwardly;
    means for sealing at least between said retainer member and said rigid sleeve member, said sealing means including a rubber member which is disposed on one of the retainer member and an axial end of the rigid sleeve member corresponding to said at least one axial end of said inner sleeve and which abuts against the other; and
    a cylindrical sliding member interposed between said inner sleeve and said rigid sleeve member and including a pair of separate cylindrical parts with an annular space of a predetermined size defined laterally by said pair of cylindrical parts, radially inwardly by the inner sleeve and radially outwardly by the rigid sleeve member, at least one of the separate cylindrical parts which is situated on the side of said retainer member having an outer flange which extends radially outwardly from one of axial ends thereof situated on the side of said retainer member.

2. A bush assemblage as set forth in claim 1, wherein at least one axial groove is formed in at least one of an inner surface of said rigid sleeve member, inner and outer surfaces of said sliding member, and an outer surface of said inner sleeve.

3. A bush assemblage as set forth in claim 1, wherein said rigid sleeve member has an outer flange extending radially outwardly from said axial end thereof corresponding to said at least one axial end of said inner sleeve, and said rubber member is disposed on an axially external surface of said outer flange and abuts against said retainer member.

4. A bush assemblage as set forth in claim 1, wherein said resilient member is secured, both to an inner surface of said outer sleeve and to an outer surface of said rigid sleeve member, through vulcanization on spot between said outer sleeve and said rigid sleeve member, so as to make an integral body consisting of said outer sleeve, said resilient member and said rigid sleeve member.

5. A bush assemblage as set forth in claim 1, wherein said sliding member is made of an oil-containing plastic material.

6. A bush assemblage as set forth in claim 1, wherein an retainer member is located at each of axial ends of said inner sleeve, and a sealing means is provided corresponding to each of the retainer members.

7. A bush assemblage as set forth in claim 1, wherein said annular space of a predetermined size has an axial length equal to a length obtained by subtracting an axial length of the rigid sleeve member from an axial length between opposite axial ends of the cylindrical sliding member when in position in the bush assemblage.

8. A bush assemblage as set forth in claim 7, wherein said rubber member of said sealing means has at least one groove which is formed, circumferentially of the bush assemblage, in a surface thereof at which the rubber member abuts against the other of said retainer member and said axial end of said rigid sleeve member.

9. A bush assemblage having an inner sleeve, an outer sleeve disposed around the inner sleeve in coaxial and radially-spaced relation therewith, a rigid sleeve member disposed between the inner and outer sleeves, and a cylindrical resilient member interposed between the outer sleeve and the rigid sleeve member, comprising:
    a retainer member located at at least one of axial ends of of said inner sleeve to extend radially outwardly; and
    a cylindrical sliding member interposed between said inner sleeve and said rigid sleeve member and including a pair of separate cylindrical parts with an annular space of a predetermined size defined laterally by said pair of cylindrical parts, radially inwardly by the inner sleeve and radially outwardly by the rigid sleeve member, at least one of the separate cylindrical parts which is situated on the side of said retainer member having an outer flange which extends radially outwardly from one of axial ends thereof situated on the side of said retainer member.

10. A bush assemblage as set forth in claim 9, wherein said annular space of a predetermined size has an axial length equal to a length obtained by subtracting an axial length of the rigid sleeve member from an axial length between opposite axial ends of the cylindrical sliding member when in position in the bush assemblage.

11. A bush assemblage as set forth in claim 9, wherein at least one axial groove is formed in at least one of an inner surface of said rigid sleeve member, inner and outer surfaces of said sliding member, and an outer surface of said inner sleeve.

12. A bush assemblage as set forth in claim 9, wherein said sliding member is made of an oil-containing plastic material.

13. A bush assemblage having an inner sleeve, an outer sleeve disposed around the inner sleeve in coaxial and radially-spaced relation therewith, a rigid sleeve member disposed between the inner and outer sleeves, and a cylindrical resilient member interposed between the outer sleeve and the rigid sleeve member, comprising:
- a retainer member located at at least one of axial ends of said inner sleeve to extend radially outwardly;
- means for sealing at least between said retainer member and said rigid sleeve member, said sealing means including a rubber member which is disposed on one of the retainer member and an axial end of the rigid sleeve member corresponding to said at least one axial end of said inner sleeve and which abuts against the other; and
- a cylindrical sliding member interposed between said inner sleeve and said rigid sleeve member and including a pair of separate cylindrical parts with an annular space of a predetermined size defined by said pair of cylindrical parts, the inner sleeve and the rigid sleeve member, at least one of the separate cylindrical parts which is situated on the side of said retainer member having an outer flange which extends radially outwardly from one of axial ends thereof situated on the side of said retainer member;
- wherein said annular space of a predetermined size has an axial length equal to a length obtained by subtracting an axial length of the rigid sleeve member from an axial length between opposite axial ends of the cylindrical sliding member when in position in the bush assemblage.

14. A bush assemblage as set forth in claim 13, wherein said rubber member of said sealing means has at least one groove which is formed, circumferentially of the bush assemblage, in a surface thereof at which the rubber member abuts against the other of said retainer member and said axial end of said rigid sleeve member.

15. A bush assemblage having an inner sleeve, an outer sleeve disposed around the inner sleeve in coaxially and radially-spaced relation therewith, a rigid sleeve member disposed between the inner and outer sleeves, and a cylindrical resilient member interposed between the outer sleeve and the rigid sleeve member, comprising:
- a retainer member located at at least one of axial ends of said inner sleeve to extend radially outwardly; and
- a cylindrical sliding member interposed between said inner sleeve and said rigid sleeve member and including a pair of separate cylindrical parts with an annular space of a predetermined size defined by said pair of cylindrical parts, the inner sleeve and the rigid sleeve member, at least one of the separate cylindrical parts which is situated on the side of said retainer member having an outer flange which extends radially outwardly from one of axial ends thereof situated on the side of said retainer member;
- wherein said annular space of a predetermined size has an axial length equal to a length obtained by subtracting an axial length of the rigid sleeve member from an axial length between opposite axial ends of the cylindrical sliding member when in position in the bush assemblage.

16. A bush assemblage as set forth in claim 9, wherein:
said rigid sleeve member has an outer flange which extends radially outwardly from at least one axial end thereof and a first cylindrical portion which extends axially inwardly from a circumferential edge of said outer flange;
said retainer member is located at an axial end of said inner sleeve corresponding to said at least one axial end of said rigid sleeve member, and has a second cylindrical portion which extends axially inwardly from a circumferential edge thereof and which surrounds said first cylindrical portion of the rigid sleeve member at a predetermined distance therefrom; and
means for sealing at least between said first cylindrical portion of said rigid sleeve member and said second cylindrical portion of said retainer member, said sealing means including a rubber member which is disposed on one of an outer surface of the first cylindrical portion and an inner surface of the second cylindrical portion and which abuts against the other.

17. A bush assemblage as set forth in claim 16, wherein said resilient member is secured, both to an inner surface of said outer sleeve and to an outer surface of said rigid sleeve member, through vulcanization on the spot between said outer sleeve and said rigid sleeve member, so as to make an integral body consisting of said outer sleeve, said resilient member and said rigid sleeve member.

18. A bush assemblage as set forth in claim 16, wherein said sliding member is made of an oil-containing plastic material.

19. A bush assemblage as set forth in claim 16, wherein an end space is defined by said rubber member, said outer flange of said one cylindrical part of said sliding member, said retainer member and said rigid sleeve member.

20. A bush assemblage as set forth in claim 16, wherein a retainer member is located at each of axial ends of said inner sleeve, and a rubber member is disposed corresponding to each of the retainer members.

21. A bush assemblage as set forth in claim 9, wherein:
said rigid sleeve member has an outer flange extending radially outwardly from at least one axial end thereof and a cylindrical portion extending axially outwardly from a circumferential edge of said outer flange;
said retainer member is located at an axial end of said inner sleeve corresponding to said at least one axial end of said rigid sleeve member; and
said bush assemblage further comprises means for sealing at least between said rigid sleeve member and said retainer member, said sealing means including a rubber member which is disposed on an inner surface of said cylindrical portion of the rigid sleeve member and which abuts against a circumferential surface of said retainer member.

22. A bush assemblage as set forth in claim 21, wherein said resilient member is secured, both to an inner surface of said outer sleeve and to an outer surface of said rigid sleeve member, through vulcanization on the spot between said outer sleeve and said rigid sleeve member, so as to make an integral body consisting of said outer sleeve, said resilient member and said rigid sleeve member.

23. A bush assemblage as set forth in claim 21, wherein said sliding member is made of an oil-containing plastic material.

24. A bush assemblage as set forth in claim 21, wherein a retainer member is located at each of axial ends of said inner sleeve, and a rubber member is disposed corresponding to each of the retainer members.

* * * * *